United States Patent [19]

Miyazaki

[11] 4,097,694
[45] Jun. 27, 1978

[54] TIME-DIVISION TELEPHONE SYSTEM EMBODYING TRUNKS HAVING DEMODULATING-ADDER CIRCUITS

[75] Inventor: Masami Miyazaki, Toyonaka, Japan

[73] Assignee: Toa Electric Company, Ltd., Japan

[21] Appl. No.: 703,068

[22] Filed: Jul. 6, 1976

[30] Foreign Application Priority Data

| Jul. 9, 1975 | Japan | 50-84729 |
| Jul. 28, 1975 | Japan | 50-92189 |
| Aug. 27, 1975 | Japan | 50-104435 |
| Sep. 22, 1975 | Japan | 50-115161 |
| Sep. 26, 1975 | Japan | 50-116912 |
| Oct. 29, 1975 | Japan | 50-130643 |
| Nov. 18, 1975 | Japan | 50-139099 |

[51] Int. Cl.² .......................... H04J 3/02; H04M 3/56
[52] U.S. Cl. ...................... 179/15 AT; 179/18 BC; 179/18 BF
[58] Field of Search .................. 179/1 H, 37-40, 179/15 AL, 15 AT, 15 BA, 18 BC, 18 BF

[56] References Cited

U.S. PATENT DOCUMENTS

| 3,581,016 | 5/1971 | Martinelli et al. | 179/15 AT |
| 3,643,030 | 2/1972 | Sparrendahl | 179/15 BA |
| 3,728,492 | 4/1973 | Cappetti et al. | 179/15 AL |
| 3,757,053 | 9/1973 | Pell et al. | 179/1 H |
| 3,940,564 | 2/1976 | Orbach | 179/15 AT |
| 3,959,594 | 5/1976 | Srivastava | 179/15 BA |
| 3,963,870 | 6/1976 | Couder et al. | 179/15 AT |
| 3,980,833 | 9/1976 | Calcagno et al. | 179/15 AT |

*Primary Examiner*—Thomas W. Brown
*Attorney, Agent, or Firm*—Eugene E. Geoffrey, Jr.

[57] ABSTRACT

A telephone exchange system for use within a building or for interoffice communication capable of having a large number of telephone sets utilizing relatively few trunk lines and a compact central station, said system employing time division circuitry and means on each telephone set for effecting the type of communication desired as for instance conference communication with one or more other telephones, paging in a specific area or areas or paging throughout all areas.

12 Claims, 20 Drawing Figures

TIME-DIVISION TELEPHONE SYSTEM EMBODYING TRUNKS HAVING DEMODULATING-ADDER CIRCUITS

This invention relates to an improved telephone exchange system, which is especially useful as a private telephone system, for example, in a firm or a building independent of the public telephone system.

Although a variety of private telephone exchange systems have been developed and are available commercially, they have such disadvantages and inconveniences such as the increase in the number of the terminal telephone sets, that is, the subscribers, is practically limited since, with increase of the number of subscribers, not only the number of line conductors increases but also the central processing unit becomes significantly larger and more complicated and expensive, that they have few, if any, functions other than simple conversation and it is almost hopeless to increase their functions in view of their structure, and that they often suffer such troubles as cross talk and service interruptions which are generally caused by erroneous operation which sometimes is beyond correction.

Accordingly, an object of this invention is to provide an improved telephone exchange system including few line conductors and a compact central unit and having many functions in addition to the normal conversation and a high degree of reliability.

The telephone exchange system according to this invention comprises a plurality of telephone sets each having a microphone and an ear-phone, means for generating a hook signal in response to a telephone call starting action and means for generating coded information signals, a plurality of pairs of first gates connected respectively to said microphones and ear-phones, a first line conductor connected in common to the outputs of said first gates connected to said microphones, a second line conductor connected in common to the inputs of said first gates connected to said earphones, a plurality of trunk circuits each including a demodulator-adder circuit for demodulating and then adding the inputs thereof and a coded information receiving circuit connected to the output of said demodulator-adder circuit for receiving said coded information signal selectively from said output, second and third gates connected between said first line conductor and the inputs of said demodulator-adder circuit of said each trunk circuit, a fourth gate connected between the output of said demodulator-adder circuit of said each trunk circuit and said second line conductor, a common signal sound generating device connected to the inputs of said fourth gates through fifth gates respectively, a subscriber scanning device for receiving a hook signal from a first telephone set which may be an arbitrary one of said plurality of telephone sets and producing a subscriber discriminating signal for said telephone set, a central information processor for storing the status of said plurality of telephone sets and trunk circuits and time-divisional gating signals which are peculiar respectively to said plurality of telephone sets, producing a first subscriber information signal corresponding to said first telephone set and a trunk signal for designating one of the vacant trunk circuits in response to said subscriber discriminating signal and also producing a second subscriber information signal corresponding to a second telephone set which is designated by the output of the coded information receiving circuit of said designated trunk circuit in response to said output, and a gate control device for supplying said time-divisional gating signal which is peculiar to said first telephone set to said first gates connected to said first telephone set and said second, fourth and fifth gates connected to said designated trunk circuit and also supplying said time-divisional gating signal which is peculiar to said second telephone set to said first gates connected to said second telephone set and said third, fourth and fifth gates connected to said designated trunk circuit.

Other objects and features of this invention will be described in detail hereinunder with reference to the accompanying drawings.

Figure 1:
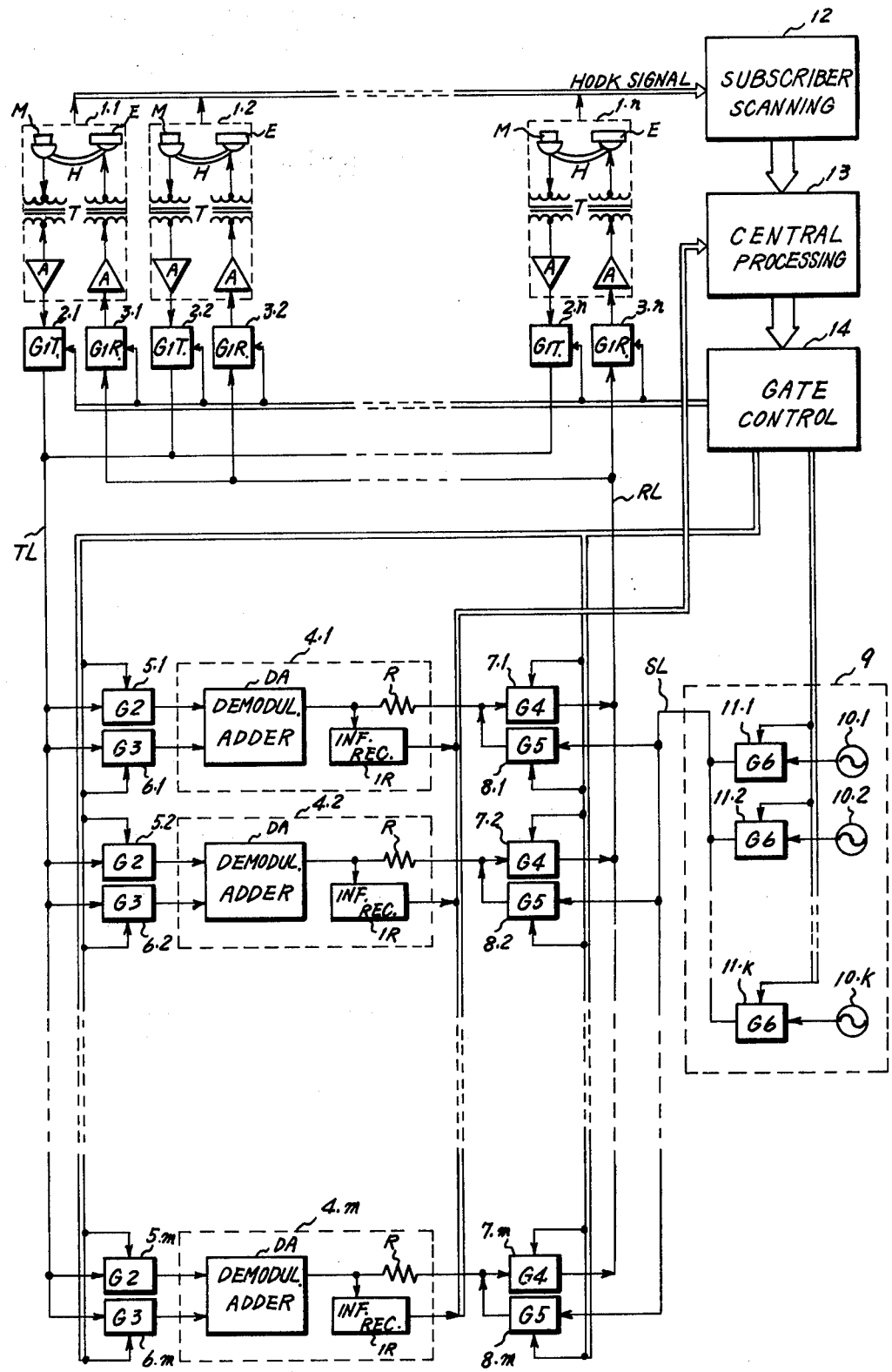
FIG. 1 is a schematic circuit diagram representing in block form a fundamental configuration of the system of this invention.
Figure 15:
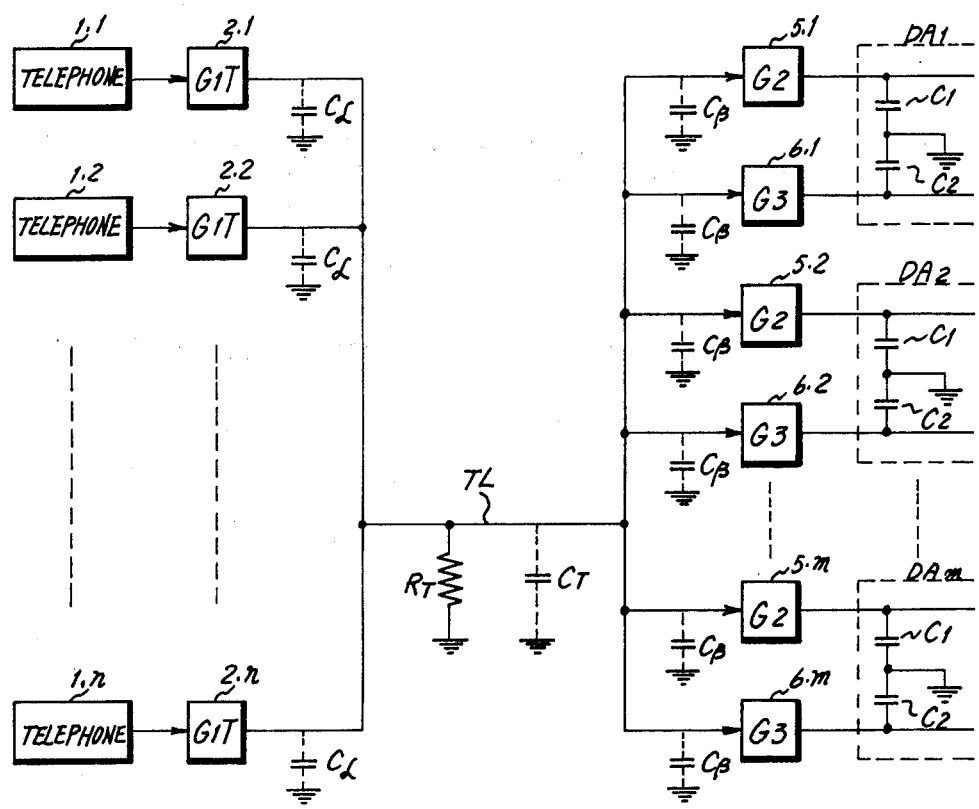
FIG. 15 is a diagram representing a circuit connection of the respective gates of FIG. 1, presented for an aid in explaining a particular aspect of the circuit of FIG. 1.
Figure 16:
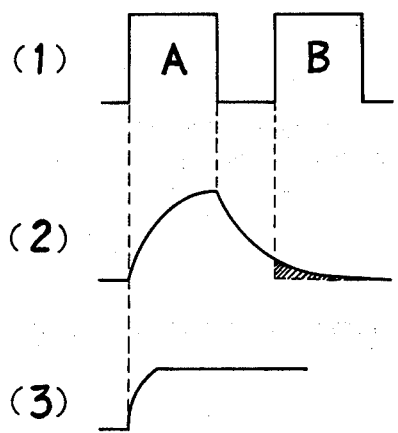
Figure 17:
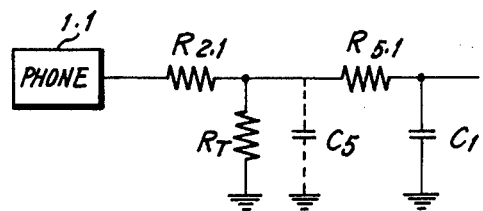
Figure 18:
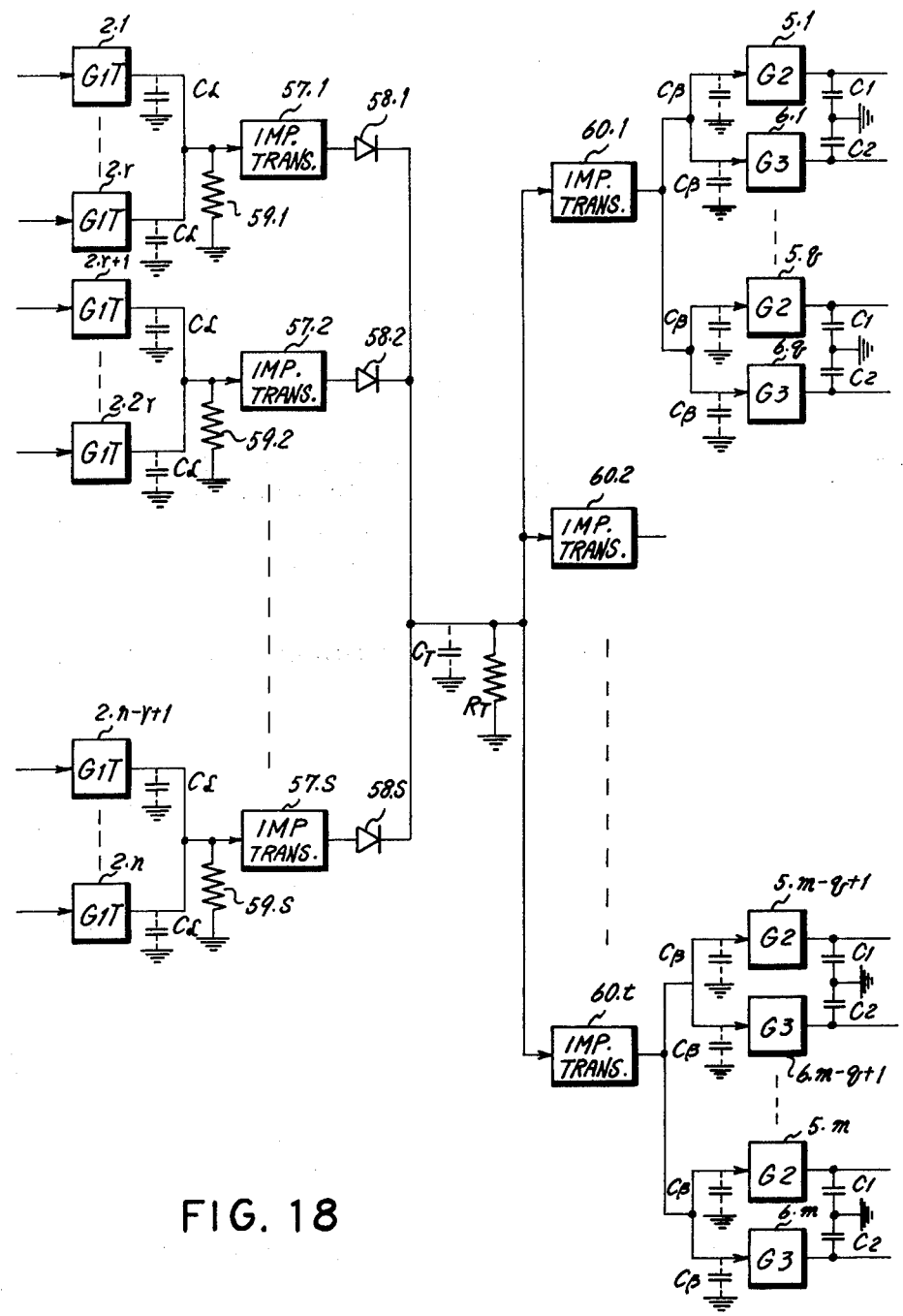
Figure 19:
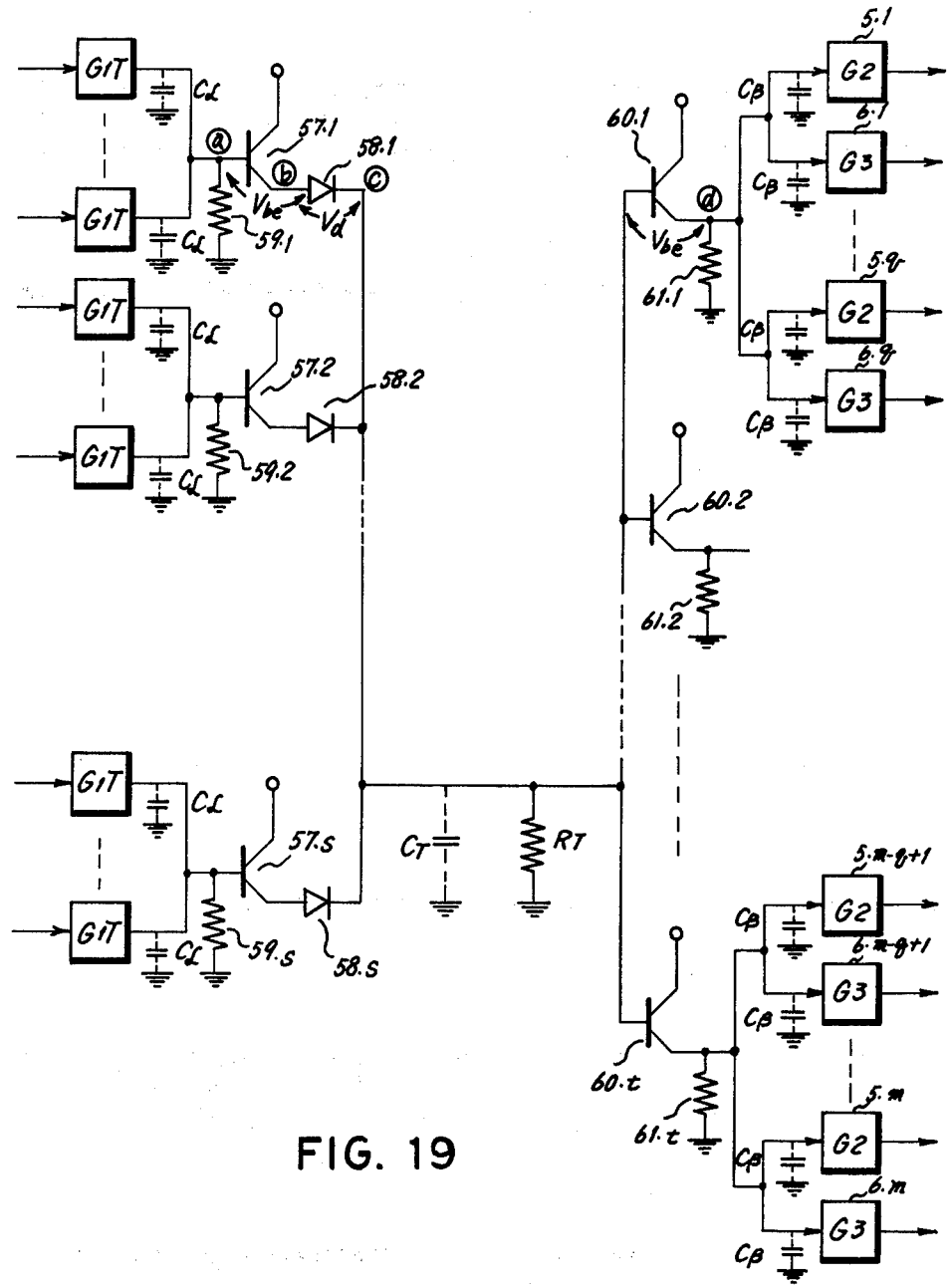
Figure 20:
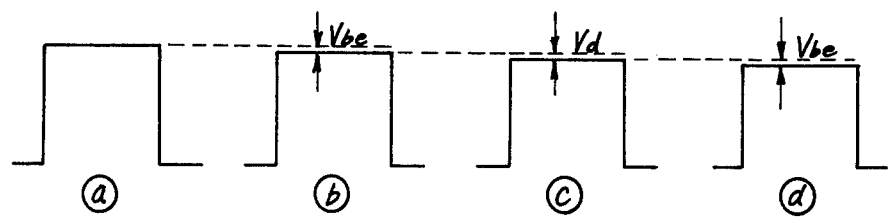

FIGS. 16(1), (2) and (3) are waveform diagrams representing signal waveforms at certain points of the circuit of FIG. 15;

FIG. 17 is a diagram representing an equivalent circuit of the circuit of FIG. 15 in its specific operation;

FIG. 18 is a schematic circuit diagram representing an embodiment of circuit connection of the circuit of FIG. 1 according to this invention;

FIG. 19 is a circuit diagram representing a more concrete embodiment of the circuit of FIG. 18; and FIGS. 20 (a), (b), (c) and (d) are diagrams representing signal waveforms at certain points of the circuit of FIG. 19, presented for an aid in explaining operation of that circuit.

Throughout the drawings, like reference numerals and symbols are used to denote like structural components.

Referring to FIG. 1, the system includes a plurality of telephone sets 1.1, 1.2, . . . 1.n as shown by dashed blocks, and each telephone set includes a handset H having a microphone M and an earphone E, a pair of transformers T and a pair of amplifiers A, which form a transmission channel and a reception channel, respectively. Though not shown in the drawing, each telephone set also includes a hook signal generator, which may be a simple contact switch, for generating a so-called "hook signal" when the handset is taken up, and a coded information generator, which may be a telephone dial or a key board, for generating coded information such as telephone number and other coded instructions by manual operation.

The outputs of the transmission channels of the telephone sets 1.1, 1.2, . . . 1.n are connected respectively through a plurality of gates "G1T" 2.1, 2.2, . . . 2.n to a single line conductor TL and, similarly, the inputs of the reception channels of these telephone sets are supplied respectively through a plurality of gates "G1R" 3.1, 3.2, . . . 3.n from a single line conductor RL.

Between the both line conductors TL and RL, connected in parallel fashion are a plurality of trunk circuits 4.1, 4.2, . . . 4.m (generally, m < n) through gates "G2" 5.1, 5.2, . . . 5.m, gates "G3" 6.1, 6.2, . . . 6.m and gates "G4" 7.1, 7.2, . . . 7.m. Each trunk circuit includes a demodulator-adder circuit DA having a pair of inputs and a single output and a coded information receiver IR connected to the output of the demodulator-adder circuit DA, and is connected between both line conductors TL and RL in such fashion that the pair of inputs of the demodulator-adder circuit DA are connected respectively through the gates G2 and G3 to the line conductor TL and the output thereof is connected through a resistor R and the gate G4 to the line conductor RL.

To the inputs of the gates G4 7.1, 7.2, . . . 7.m there is also supplied the output of a signal sound generating unit 9 as shown by a dashed block in the drawing through a single line conductor SL and a plurality of gates "G5" 8.1, 8.2, . . . 8.m, respectively. The signal sound generating unit 9 includes a plurality of sound signal generators 10.1, 10.2, . . . 10.k and corresponding gates "G6" 11.1, 11.2, . . . 11.k, and the generators 10.1, 10.2, . . . 10.k are connected respectively through the corresponding gates G6 to the common line conductor SL.

The hook signals from the respective telephone sets 1.1, 1.2, . . . 1.n are transferred generally through loop current circuits to a subscriber scanning device 12 of a known type, which scans the subscribers or telephone sets and produces subscriber discriminating signals corresponding to the subscribers from which the hook signals are transferred.

The output of the subscriber scanning device is coupled to a central processing unit 13 for producing gate instruction signals. The outputs of the coded information receivers LR are connected also to the unit 13. The output of the central processing unit 13 is coupled to a gate control unit 14 having outputs, that is, gating signals which are applied respectively to the control terminals of all the gates G1, G2, . . . G6 in accordance with the instruction signals applied from the central processing unit 13.

Figure 2:
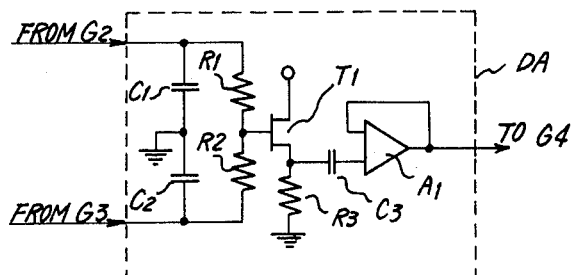
FIG. 2 is a circuit diagram representing an embodiment of the trunk circuit used in the system of FIG. 1.

FIG. 2 shows an embodiment of the demodulator-adder circuit DA of each trunk circuit. The inputs from the gates G2 and G3 are respectively applied to both ends of a parallel connection of a series connection of two capacitors C1 and C2 and a series connection of two resistors R1 and R2. The junction of C1 and C2 is grounded and the junction of R1 and R2 is connected to the gate electrode of a field-effect transistor T1 with source electrode connected to a voltage source and drain electrode grounded through a resistor R3. The drain electrode is also connected through a capacitor C3 to the input of an amplifier A1. The output of the amplifier A1, that is, the output of the demodulator-adder circuit DA is coupled to the gate G4 as described previously.

Now the operation of the system will be described hereinunder with reference to FIG. 3 as well as FIGS. 1 and 2.

When the handset H of an arbitrary telephone set, which is hereinunder marked "A", is taken up, a hook signal is transferred to the subscriber scanning unit 12. The unit 12 detects that this hook signal came from the telephone set "A" and sends a subscriber "A" discriminating signal to the central processing unit 13. Thus, the "ENGAGED" condition of the subscriber "A" is written in the memory of the unit 13 and the subscriber "A" information stored previously in the memory of the unit 13 is read out and transferred to the gate control unit 14. The subscriber "A" information includes a time-divisional gate control signal PA (FIG. 3) and the gate control unit 14 sends this signal to the gates G1T and G1R belonging to the telephone set "A". The time-divisional gate control signal is previously determined so as to be exclusively peculiar to each subscriber.

At the same time, the central processing unit 13 reads out from its memory a vacant one of the trunk circuits 4.1, 4.2, . . . 4.m and sends a trunk information signal to the gate control unit 14 to designate a trunk circuit to be used. Thus, the gate control unit 14 sends the same gate control signal PA to the gates G2, G4 and G5 belonging to the trunk circuit designated by the central processing unit 13.

Then, a coded information signal representing the telephone number of another arbitrary telephone set, which is hereinunder marked "B", is transferred from the telephone set "A" through the gates G1T and G2 which are opened synchronously by the control signal PA and through the demodulator-adder circuit DA, and picked up by the coded information receiver IR and thereby transferred to the central processing unit 13. The central unit 13 senses the subscriber "B" and, if it is vacant, sends a subscriber "B" information to the gate control unit 14. The gate control unit 14 transfers a time-divisional gate control signal PB (FIG. 3) to the gates G1T and G1R of the telephone set "B" and the gates G3, G4 and G5 of the designated trunk circuit.

At the same time, the central processing unit 13 produces a sound signal information designating the "CALL" signal and the gate control unit 14 sends both gate control signals PA and PB to the gate G6 of the signal sound generating unit 9, which is connected to the sound signal generator arranged to produce the "CALL" signal. Thus, the "CALL" signal is synchronously sampled by both gate control signals PA and PB at the gates G6, G5 and G4 to form a waveform S1 as shown in FIG. 3. The waveform S1 consists of two groups of pulses S1A and S1B and is transferred through the line conductor RL, and the group S1A is sampled by the gate control signal PA at the gate G1R of the telephone set "A", while the group S1B is sampled by the control signal PB at the gate G1R of the telephone set "B". Thus, the "CALL" signal is reproduced by the reception channels of both telephone sets "A" and "B" and the "CALL" sound is heard by both subscribers "A" and "B" concurrently.

If the subscriber "B" is "engaged", the gate G6 connected to the sound signal generator arranged to produce the "ENGAGED" signal is driven by the control signal PA. Therefore, the subscriber "A" hears an "ENGAGED" sound.

When the subscriber "B" takes up his handset H in response to the CALL signal, the hook signal is sensed by the subscriber scanning unit 12 and the central processing unit 13 sends an instruction to the gate control unit 14 to close the gate G6 to stop the CALL signal.

Figure 3:
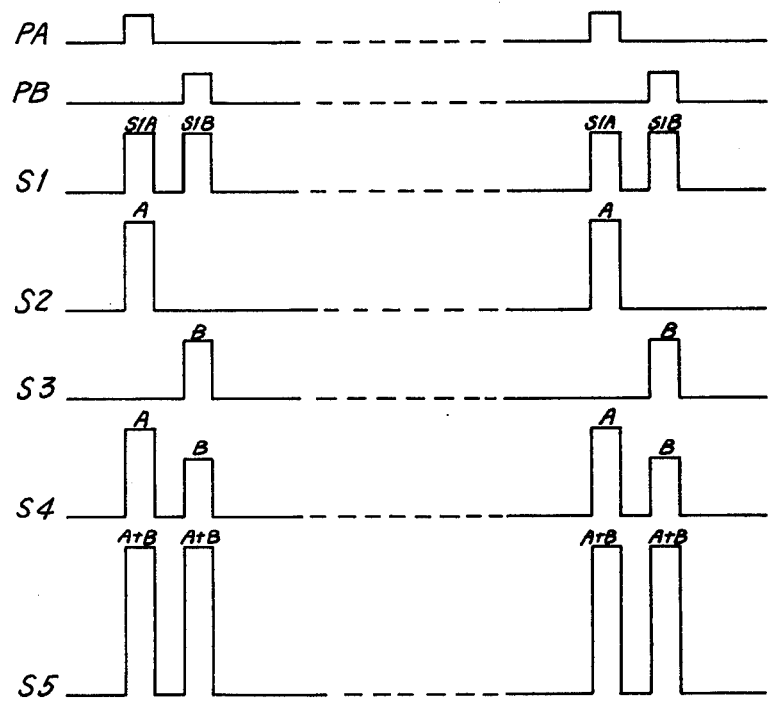
FIG. 3 is a waveform diagram presented as an aid in explaining the operation of the system of FIG. 1.

Now, the conversation signal produced by the transmission channel of the telephone set "A" is sampled by the gate control signal PA at the gate G1T to form a waveform S2 and the conversation signal produced by the transmission channel of the telephone set "B" is sampled by the waveform PB at the corresponding gate G1T to form a wave form S3, for example, as shown in FIG. 3. As will be understood, the conversation signal output from each gate G1T is a pulse-amplitude-modulated signal. Both signals S2 and S3 are transferred through the line conductor TL as a waveform S4 having two groups of pulses A and B and then sampled respectively by the gates G2 and G3 to be supplied to the two inputs of the demodulator-adder circuit DA of the trunk circuit.

The inputs of the demodulator-adder circuit DA are demodulated and summed up therein at the same time. This function will be well understood with reference to the circuit of FIG. 2. The signals S2 and S3 are supplied respectively to both ends of the series connection of the capacitors C1 and C2 and stored temporarily in these capacitors. Accordingly, both signals appear at both ends of the series connection of the resistors R1 and R2 at the same time though the application of both signals to the circuit is not at the same time, and a voltage corresponding to the sum appears at the junction of both resistors. This voltage is amplified by the field effect transistor T1 and the amplifier A1 and output from the demodulator-adder circuit DA.

This sum signal is sampled by the gate control signals PA and PB at the gate G4 to form a waveform S5 consisting of two groups of pulses having the same amplitude which corresponds to the sum of the amplitudes of the pulses A and B. Both groups are transferred through the line conductor RL and sampled respectively by the gates G1R of the telephone sets "A" and "B". Accordingly, the voices of both subscribers "A" and "B" are concurrently heard by both subscribers.

As the gate control signals are respectively peculiar to the subscribers as abovementioned, the same operation is obtainable between any pair of subscribers in completely independent and confidential condition with respect to the other subscribers, as long as a vacant trunk circuit exists.

The resistor R in the trunk circuit serves a function of maintaining the output impedance of the demodulator-adder circuit DA higher than the input impedance of the gate G4 for preventing backward flow of the sound signal from the gate G5 to the demodulator-adder circuit. It will be understood that the output of each gate G5 may be connected to the output of the gate G4 instead of its input. It will be further understood that the gates G5 may be omitted by connecting the line conductor SL directly to the line conductor RL. However, it should be noted that such reduction and omission of repeated gatings may increase interference and other troubles.

Figure 4:
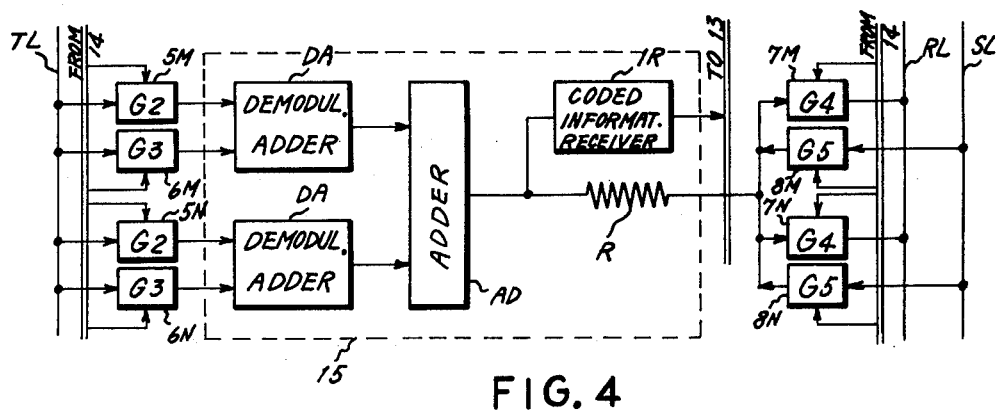
FIG. 4 is a schematic block diagram representing a variation of the circuit of FIG. 1.

Referring next to FIG. 4 showing a variation of the trunk circuit, which will be referred hereinunder as "conference trunk". This trunk circuit 15 includes two demodulator-adder circuits DA, an adder circuit AD connected to the outputs of both demodulator-adder circuits, a resistor R connected at an end to the output of the adder circuit AD and a coded information receiver IR connected also to the output of the adder circuit. The four inputs of the trunk circuit 15 are respectively connected through two "G2" gates 5M and 5N and two "G3" gates 6M and 6N to the common line conductor TL and the other end of the resistor R is connected through a pair of "G4" gates 7M to the line conductor RL and through a pair of "G5" gates 8M and 8N to the line conductor SL. It is noted that the conference trunk 15 is identical in structure to a pair of normal trunk circuits as shown in FIG. 1 which jointly utilize a coded information receiver IR and a resistor R and is additionally provided with an adder AD.

According to another feature of this invention, the system is provided with a plurality of conference trunks as above in addition to the normal trunk circuits 4.1, 4.2, . . . 4.m (FIG. 1). When the "CONFERENCE" key of the coded information input keyboard on one telephone set marked "A" is actuated, a "CONFERENCE" information produced thereby is transferred to the central processing unit 13 and the central processing unit 13 designates a vacant conference trunk 15. In response to trunk information from the central processing unit 13, the gate control unit 14 sends the gate control signal PA peculiar to the subscriber "A" to the gates 5M, 7M and 8M. If the subscriber "A" calls the second subscriber "B" by the key board in this condition, coded subscriber "B" information is transferred through the gate 5M, demodulator-adder DA and adder circuit AD and picked up by the coded information receiver IR and the gate control signals PB peculiar to the subscriber "B" is sent to the gates 6M, 7M and 8M, thereby a CALL signal is transferred to the subscriber "B", as described with reference to the trunk circuit of FIG. 1. Similarly, the subscriber "A" can call third and fourth subscribers "C" and "D" by pushing the telephone numbers of them successively to send the gate control signal of the subscriber "C" to the gates 5N, 7N and 8N and that of the subscriber "D" to the gates 6N, 7N and 8N, respectively.

Thus, the voices of the subscribers "A" and "B" are transferred through the gates 5M and 6M to the corresponding demodulator-adder circuit and the voices of the subscribers "C" and "D" are transferred through the gates 5N and 6N to the other demodulator-adder circuit, respectively, to be demodulated and summed up. The sum outputs of both demodulator-adder circuits DA are summed up again in the adder circuit AD to form a total sum of the voice signals of the four subscribers "A", "B", "C" and "D". The resultant sum output of the adder circuit AD is sampled at the gates G4 and the gates G1R of the respective subscribers by their peculiar gate control signals. Accordingly, the voice of any subscriber can be heard by all the subscribers and, therefore, these four subscribers can have a conference together through their telephones.

Although the abovementioned conference trunk can be used for a conference of four or less members only, it is to be understood that a large-scaled conference trunk can be used for larger conferences of five or more members and can be constructed by combining three or more trunk circuits through a single adder circuit AD.

Figure 5:
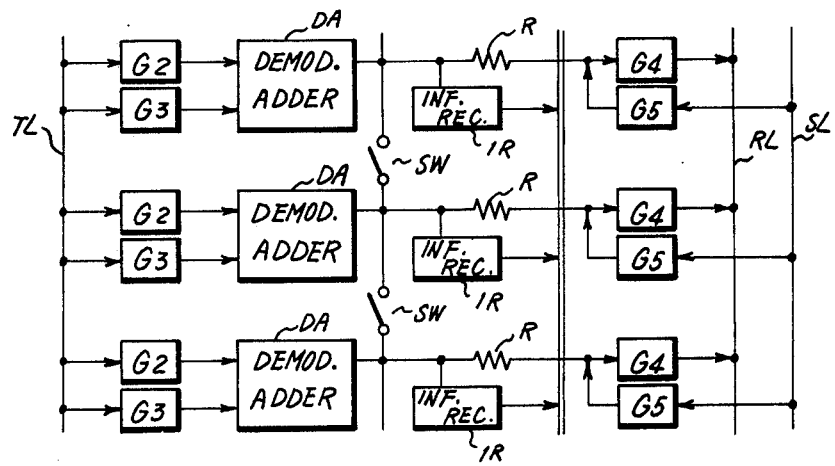
FIG. 5 is a schematic block diagram representing another variation of the circuit of FIG. 1.

FIG. 5 shows another variation of the system of FIG. 1. As shown in the drawing, a switch SW is inserted between the outputs of the demodulator-adder circuits DA of every adjoining trunk circuit in this embodiment. When one switch SW is closed to combine two trunk circuits, the outputs of the demodulator-adder circuits of both trunk circuits are intermixed through the switch SW. Therefore, if the gates G4 and G5 of both trunk circuits are driven in common by the gate control signals of all subscribers involved, the same function as in the conference trunk of FIG. 4 is obtainable. In this embodiment, moreover, larger conferences can be obtained by simply closing two or more switches SW to combine three or more trunk circuits. Control of the switches SW and the gates G4 and G5 may be effected by previously programming the central processing unit 13.

Figure 6:
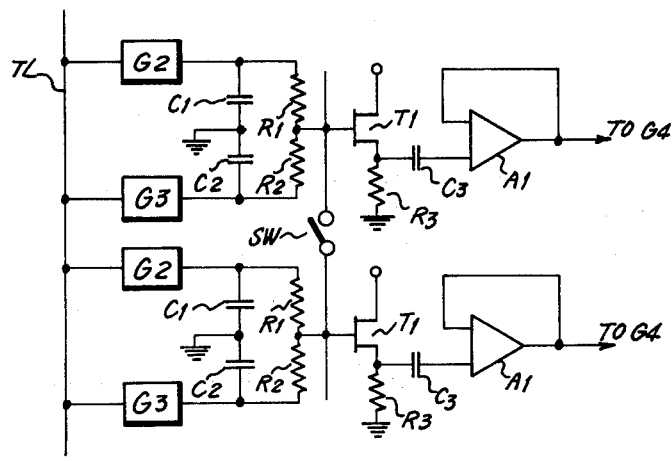
FIG. 6 is a circuit diagram representing an embodiment of the circuit of FIG. 5.

FIG. 6 shows a circuit in which the demodulator-adder circuit DA of FIG. 2 is utilized in the embodiment of FIG. 5. As the circuit is self-explanatory, no further description will be made thereon.

Figure 7:
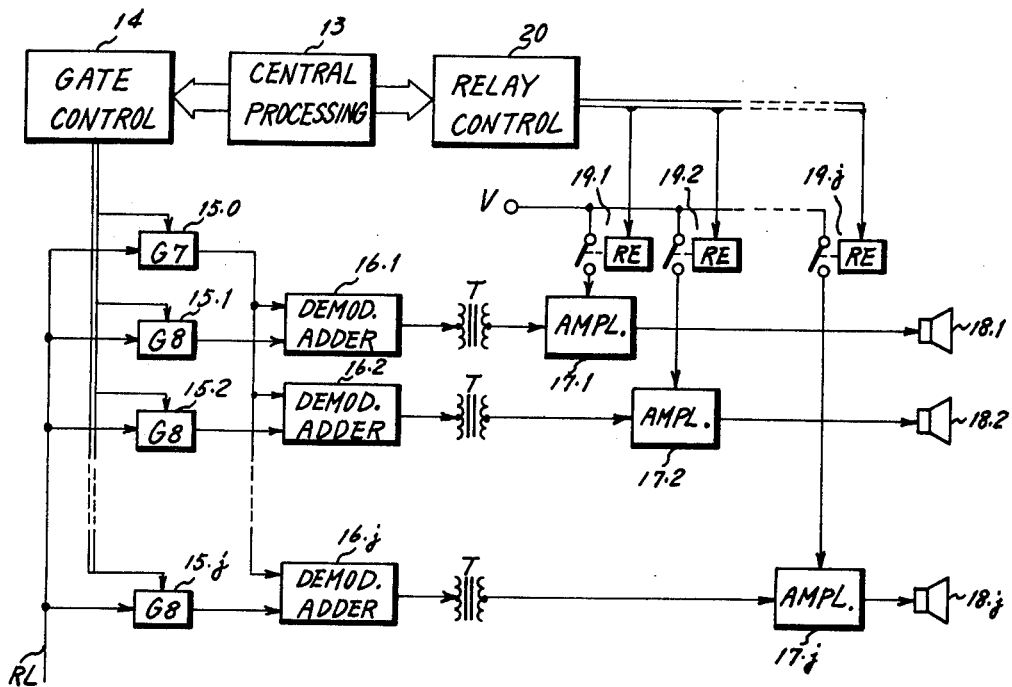
FIG. 7 is a schematic block diagram representing a modification of the circuit of FIG. 1.

Referring next to FIG. 7, this system includes a gate "G7" 15.0 and a plurality of gates "G8" 15.1, 15.2, . . . 15.j which are controlled by the gate control unit 14 in substantially same fashion as the "G1R" gates, and in addition to the latter, and the line conductor RL is connected to the inputs of the gates G7 and G8, respectively. The system further includes a plurality of demodulator-adder circuits 16.1, 16.2, . . . 16.j, which are analogous to the demodulator-adder circuits DA in the trunk circuits as described in conjunction with the system of FIG. 1, and the output of the gate G7 is connected to the first inputs of the all demodulator-adder circuits, while the outputs of the gates G8 are connected respectively to the second inputs of the respective demodulator-adder circuits. The outputs of the demodulator-adder circuits 16.1, 16.2, . . . 16.j are connected respectively through transformers T and amplifiers 17.1, 17.2, . . . 17.j to speakers 18.1, 18.2, . . . 18.j. Each speaker may be a group of speakers. Each amplifier is provided with a driving terminal and a driving voltage is supplied from a voltage source V through relay switches 19.1, 19.2, . . . 19.j respectively to the driving terminals of the respective amplifiers. The relay switches are controlled by a relay control unit 20 coupled to the central processing unit 13.

When a subscriber marked "C" wants to page through a speaker marked "D", for example, he pushes certain keys on his key-board in a predetermined fashion to input coded "local-C paging" information. This coded information is received by the coded information receiving circuit IR of a specified vacant trunk circuit and transferred to the central processing unit 13. The central unit 13 sends gate information to the gate control unit 14 and relay information to the relay control unit 20.

In response to the gate information, the gate control unit 13 sends a time-division gate control signal peculiar to the subscriber "C" to the gates G1T and G1R of the subscriber "C" and the gate G2 of the specified trunk circuit, another time-division gate control signal peculiar to the speaker "D" to the gate G3 of the same trunk circuit and the gate G8 corresponding to the speaker "D", and both gate control signals to the gates G4 and G5 of the same trunk circuit and the gate G6 connected to the sound signal generator which produces a paging notice sound. At the same time, in response to the relay information, the relay control unit 20 sends a relay driving signal to the relay switch coupled to the amplifier corresponding to the speaker "D", thereby actuating said amplifier.

Thus, the paging notice sound and succeeding voice of the subscriber "C", which are transferred through the line conductor RL, are sampled by the above active gate G7, demodulated by the corresponding demodulator-adder circuit, amplified by the actuated amplifier and reproduced by the speaker "D". When the subscriber "C" puts down the handset, the central processing unit 13 sends an instruction to the gate control unit 14 and the relay control unit 20 to interrupt the gate control signals and the relay driving signal, to restore the original condition.

When the subscriber "C" wants to page through all the speakers, he pushes certain keys in predetermined fashion to input coded "over-all paging" information. In this case, the central processing unit 13 is previously programmed to send instructions to the gate control unit 14 and the relay control unit 20 to send a time-division gate control signal peculiar to "over-all paging" to the gate G7 and also to the gates G3, G4, G5 and G6 as abovementioned, and to send a relay driving signal to all the relay switches 19.1, 19.2, . . . 19.j. Thus, the paging notice sound and the subscriber's voice are sampled by the gate G7, demodulated by all the demodulator-adder circuits 16.1, 16.2, . . . 16.j and, therefore, reproduced by all speakers 18.1, 18.2, . . . 18.j.

In case of "over-all paging", cross-talk or interference may occur when "local paging" is made at the same time through one of the speakers. However, the trouble can be overcome by previously programming the central unit 13 so that the gate G8 used for the "local paging" is temporarily closed for the "over-all paging" time.

Figure 8:
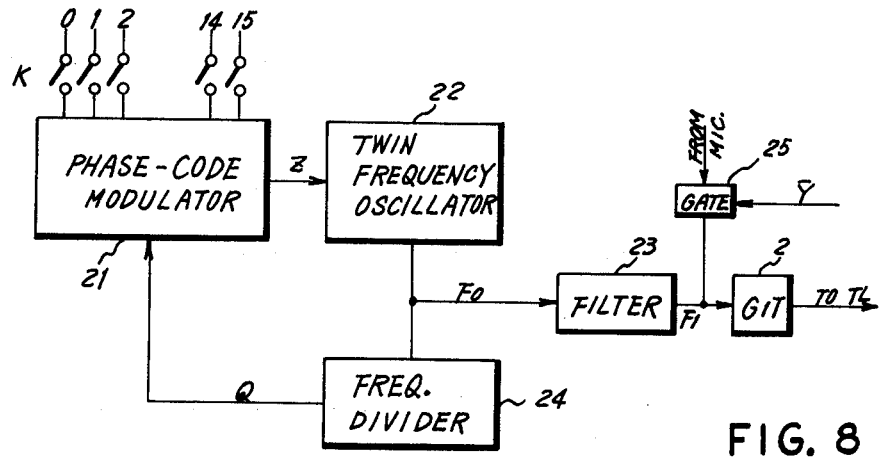
FIG. 8 is a block diagram representing a coded information transmitting system included in the system according to this invention.

Referring to FIG. 8, this block diagram represents a schematic configuration of the means for generating coded information signals included in each telephone set as described in the preface and specified in the claims. This means includes a phase-code modulator circuit 21 provided with a key board K having a plurality of keys numbered "0", "1", "2", . . . "15", for example. The phase-code modulator 21 produces a phase-code modulation signal "Z" corresponding to the number of a pushed key and supplies it to a twin frequency oscillator circuit 22 which produces a signal "$F_0$" having two alternating frequencies under control of the phase-code modulation signal "Z". The resultant twin frequency code modulation signal "$F_0$" is filtered by the filter 23 to remove higher harmonics and transferred through the gate "G1T" as abovementioned and the line conductor TL to a specified trunk circuit. While the voice or conversation signal also comes into the gate G1T from the microphone M as described previously, a gate 25 is provided before the gate G1T in order to block the voice signal during transmission of the coded information under control of a gate control signal Y as described later.

As a feature of this invention, the twin frequency code modulation signal $F_0$ is also supplied to a frequency divider circuit 24 and the phase-code modulator circuit 21 is controlled by the frequency-divided signals Q. This feature will be described in detail later.

Figure 9:
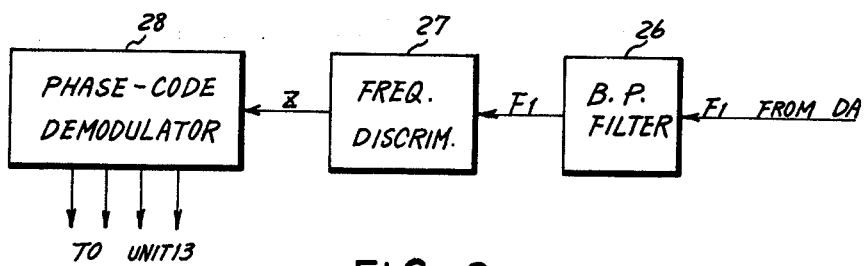
FIG. 9 is a block diagram representing a coded information receiving system included in the system according to this invention.

The coded information transferred in a form of twin frequency code modulation signal F, is received by the coded information receiving circuit IR in the trunk circuit. FIG. 9 represents a schematic configuration of this circuit. The signal $F_1$ output from the demodulator-adder circuit DA passes a band-pass filter 26 and comes in a frequency discriminator 27. The frequency discriminator 27 discriminates two frequencies included in the signal and produces an output signal which is identical to the abovementioned phase-code modulation signal Z. This signal Z is processed in a phase-code modulation demodulator circuit 28 having binary coded outputs which are supplied to the central information processing unit 13.

Figure 10:
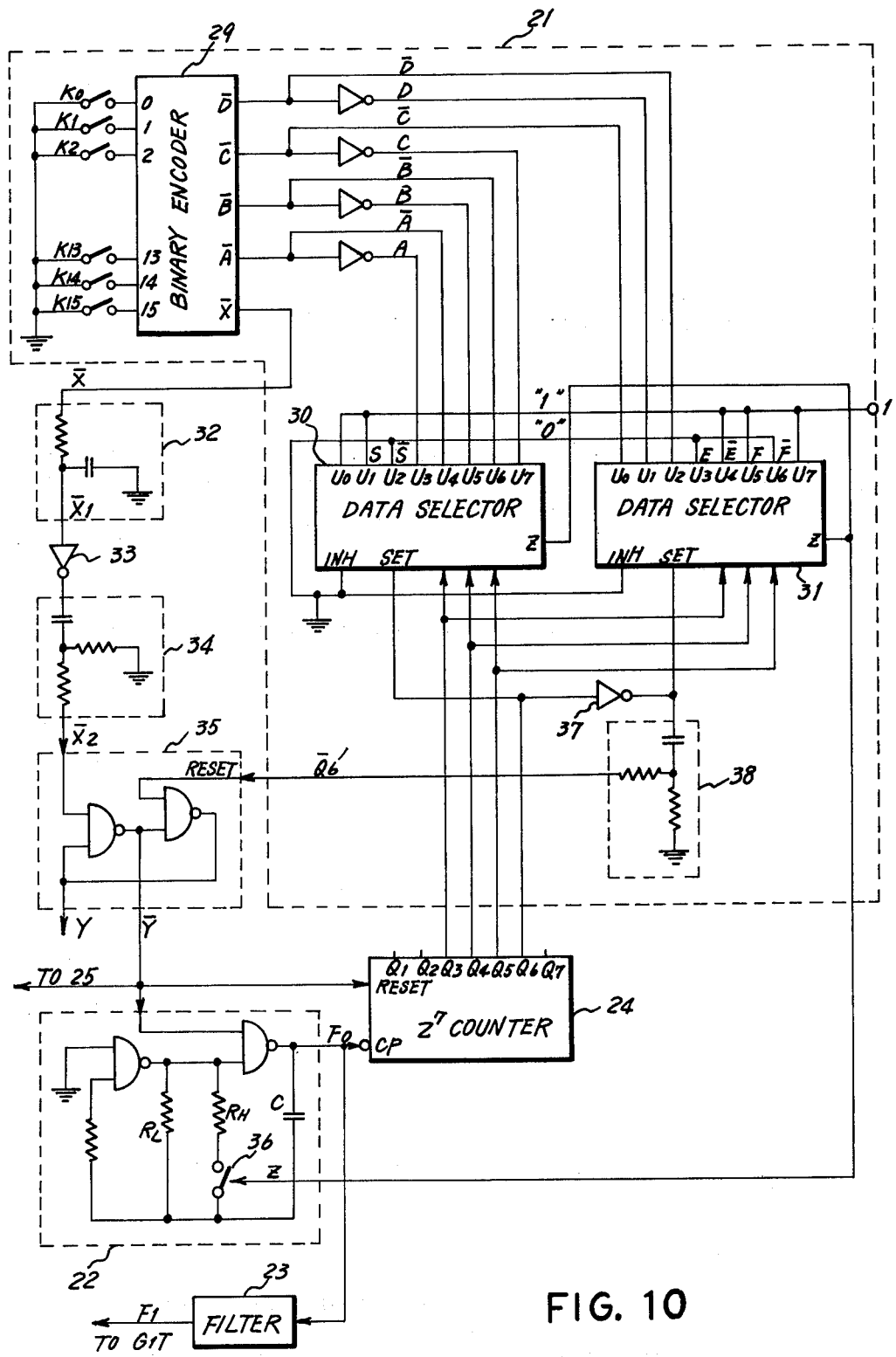
FIG. 10 is a schematic circuit diagram representing an embodiment of the system as shown in FIG. 8.

Referring to FIG. 10, there is shown an embodiment of the circuit of FIG. 8. The phase-code modulator circuit 21 includes a binary encoder 29 which is provided with a keyboard having sixteen keys $K_0$, $K_1$, $K_2$, ... $K_{15}$ corresponding respectively to decimal codes 0, 1, 2, ... 14 and 15, for example. The binary encoder 29 has five outputs A, B, C, D and X. The outputs A, B, C and D correspond respectively to inversions of the first, second, third and fourth bits of a binary code which corresponds to a decimal code input through the keyboard. For instance, when the key $K_{13}$ is pushed to input a decimal code "13" which corresponds to a binary code "1101", the outputs A, B, C and D are "0", "1", "0" and "0", respectively. The outputs A, B, C and D are applied to two data selectors 30 and 31 having seven inputs U0, U1, U2, U3, U4, U5 and U6 each, together with their originals A, B, C and D obtained through NOT gates as shown. In this embodiment, the outputs A, A, B, B and C are coupled respectively to the inputs U3, U4, U5, U6 and U7 of the data selector 30 and the outputs C, D and D are coupled respectively to the inputs U0, U1 and U2 of the data selector 31. The inputs U1 and U2 of the data selector 30 are assigned to "START" signal bits S and S and maintained always "1" and "0" respectively, and the inputs U5 and U6 of the data selector 31 are assigned to "STOP" signal bits F and F and maintained also always at "1" and "0" respectively. The fifth bits E and E are unnecessary in this embodiment since the greatest binary code is "1111" which corresponds to the last key $K_{15}$ and, therefore, the corresponding inputs U3 and U4 of the data selector 31 are maintained always at "0" and "1", respectively. Also, the first input U0 of the data selector 30 and the last input U7 of the data selector 31 are maintained always at "1" in order to keep the output reference at HIGH level.

Figure 12:
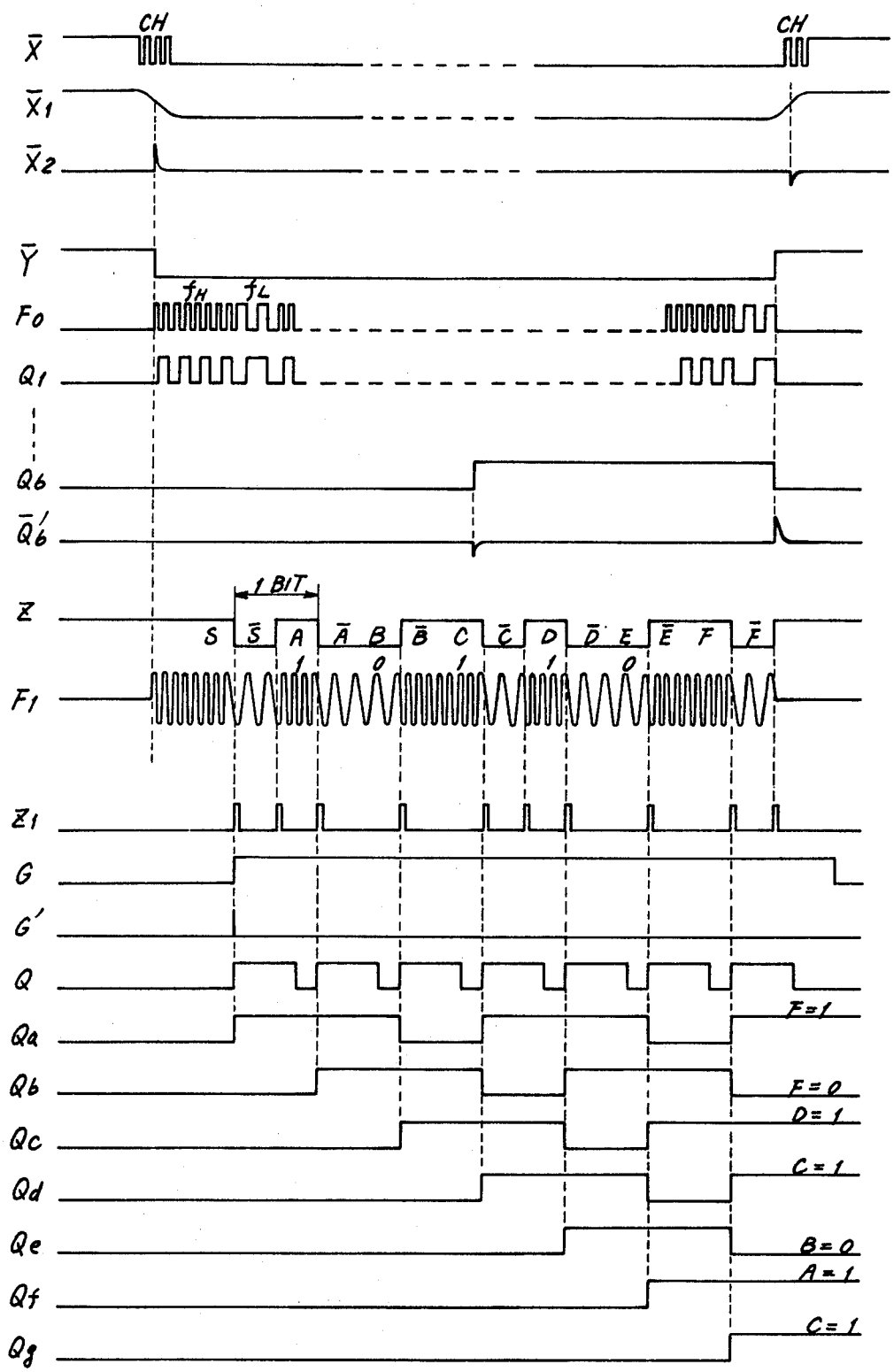
FIG. 12 is a waveform diagram presented as an aid in explaining operations of the circuits of FIGS. 10 and 11.

On the other hand, the output X of the binary encoder 29 is a signal as shown in FIG. 12, which appears in response to a pushing action of any key on the keyboard and has chatters CH, that is a plurality of pulses, at the both starting and terminating ends of the pushing action. The output X is integrated by an integration circuit 32 ($X_1$ of FIG. 12), inverted by a NOT gate 33 and then differentiated by a differentiation circuit 34 ($X_2$ of FIG. 12). The signal $X_2$ is applied to the input of a flip-flop circuit 35 consisting of two NAND gates to invert its Y output, which has been preset at HIGH level, into LOW level. In response to this inversion, the twin frequency oscillator circuit 22 initiates its operation.

The twin frequency oscillator 22 is a flip-flop circuit comprising two NAND gates, resistors $R_H$ and $R_L$, a capacitor C and a controlled switch 36 which are interconnected as shown in the drawing, and producing a clock pulse train $F_0$ (FIG. 12) with two different frequencies $f_H$ and $f_L$ for the reason as described below. The output $F_0$ of the twin frequency oscillator 22 is applied to the frequency divider 24, which is a $2^7$ counter having seven outputs Q1, Q2, ... Q7 and a RESET input connected to the Y output of the flip-flop 35 in this embodiment. The outputs Q1, Q2, ... Q7 are frequency-divided signals of the input clock $F_0$ by divisors 2, 4, 8, 16, 32, 64 and 128, respectively, while only Q1 and Q6 are shown as examples in FIG. 12.

Among the outputs of the counter 24, three outputs Q3, Q4 and Q5 are applied to both data selectors 30 and 31 as their control inputs. That is to say, every application of the control inputs, the inputs U0, U1, U2, ... U7 are successively coupled to the output terminals Z. On the other hand, the output Q6 of the counter 24 is directly connected to the SET input of the data selector 30 and is connected through a NOT gate 37 to the SET input of the data selector 31, so that the data selector 30 is operated during the LOW level of Q6 and the data selector 31 is operated during the HIGH level thereof. Thus, a phase-code modulated signal as shown by Z in FIG. 12 is produced from the output terminals Z when A, B, C and D are "1", "0", "1" and "1", respectively, for example.

In this waveform Z, one bit time corresponds to one cycle (one period) time of the quarter frequency signal Q2, and the first half thereof is occupied by a specific code (e.g., "A") and the second half is occupied by its inversion (e.g., "A").

The output of the NOT gate 37 is differentiated into a waveform Q6' (FIG. 12) by a differentiation circuit 38 and applied to the RESET terminal of the flip-flop circuit 35. Thus, the Y output of the flip-flop 35 restores its HIGH level at the trailing edge of the signal Q6 to stop operation of the oscillator 22 and reset the counter 24. The Y output is also applied to the gate 25 (FIG. 8) to close it during the operation of the oscillator 22 in order to prevent the conversation signal from mixing in the coded information signal.

During this time, the output Z is applied to the twin frequency oscillator circuit 22 as a control input of the controlled switch 36 to close it by its HIGH level and open it by its LOW level. When the switch is closed and the resistor $R_H$ is inserted in the circuit, the output $F_0$ becomes to have the high frequency $f_H$ and, when it is opened to remove the resistor $R_H$ therefrom, $F_0$ has the low frequency $f_L$.

It is understood from the above description that one bit time of the phase-code modulated signal Z is determined by frequency-division of both frequencies $f_H$ and $f_L$, so that there is no phase difference between the waveform of frequency $f_H$ and that of frequency $f_L$ at the time of frequency interchange. This is an important feature of this invention since it enables very simple demodulation of the modulated signal.

The output $F_0$ of the twin frequency oscillator circuit 22 is filtered by a filter circuit 23 to remove its higher harmonics and transferred through the gate G1T to the lead conductor TL, as a twin frequency code modulated signal $F_1$ as shown in FIG. 12.

As described previously in conjunction with the circuit of FIG. 9, the twin frequency code modulated signal $F_1$ is received by the coded information receiving circuit IR in the trunk circuit, filtered by the band-pass filter 26 and applied to the frequency discriminator circuit 27 to restore the phase-code modulated signal waveform Z as shown in FIG. 12. The phase-code modulated signal Z is demodulated by the phase-code demodulator circuit 28.

Figure 11:
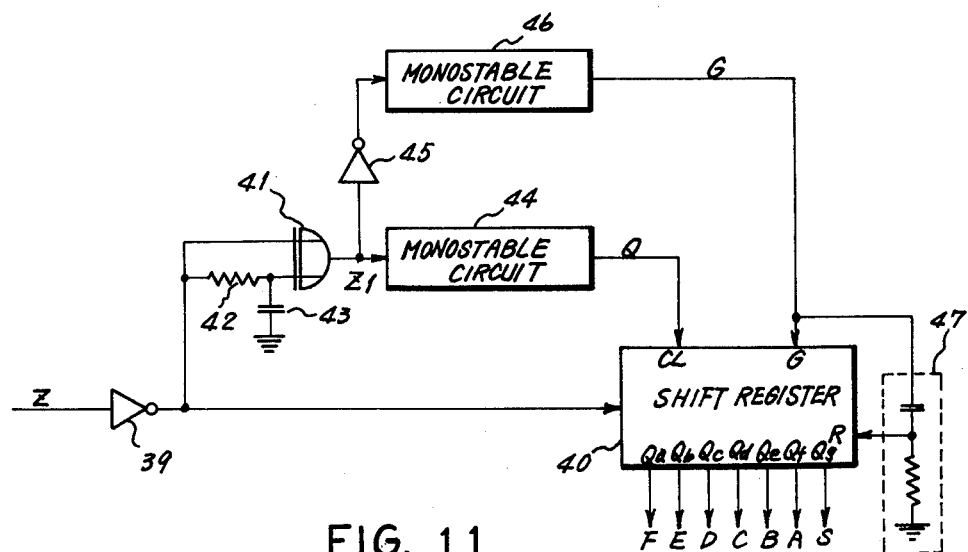
FIG. 11 is a schematic circuit diagram representing an embodiment of the system as shown in FIG. 9.

FIG. 11 shows an embodiment of the phase-code demodulator circuit 28. In this circuit, the phase-code modulated signal Z is applied through a NOT gate 39 to a shift register 40 having a clock input CL, a gate signal input G, a reset signal input R and seven parallel outputs Qa, Qb, Qc, Qd, Qe, Qf and Qg. The output of the NOT gate 39 is also applied directly to one input of an exclusive OR gate 41 and through a resistor 42 to another input thereof which is grounded through a capacitor 43. The output of the exclusive OR gate 41 is connected directly to a monostable circuit 44 whose output is connected to the clock input CL of the shift register 40, and connected through a NOT gate 45 to another monostable circuit 46 whose output is connected to the gate signal input G thereof. The output of the monstable circuit 46 is also connected through a differentiation circuit 47 to the reset input of the shift register 40.

When the inversion of Z is applied from the NOT gate 39 to the exclusive OR gate 41, one input terminal is at an opposite level with respect to the other input terminal for a short time determined by a time constant of the circuit consisting of the resistor 42 and the capacitor 43 and the output keeps HIGH level during this time and soon drops to LOW level, thereby producing a waveform as shown by $Z_1$ in FIG. 12. The monostable circuit 44 is previously arranged such that its output G becomes HIGH at each leading edge of the waveform Z, and maintains this level for a time period equal to about 75 percent of one bit time of the phase-code modulated signal Z as abovementioned. Accordingly, the output of the monostable circuit 44 is as shown at Q in FIG. 12. The signal Q is applied to the shift register 40 as its shift control pulse to control shift operation of the input Z.

On the other hand, the monostable circuit 46 is arranged such that its output becomes HIGH at the first leading edge of the signal $Z_1$ and maintains this condition until the signal Z from the frequency discriminator circuit 27 (FIG. 9) is completely transferred through the NOT gate 39 into the shift register 40. Accordingly, the output waveform of the monostable circuit 46 is shown by G in FIG. 12. This output G is differentiated by the differentation circuit 47 as shown by G' and applied to the reset terminal R of the shift register 40. Therefore, the shift register 40 is reset at the first leading edge of the inverted input signal Z.

The input signal Z is shifted successively in the shift register by the clock pulse Q and output from the terminals Qa, Qb, Qc, Qd, Qe, Qf and Qg with waveforms as shown by the same symbols in FIG. 12, respectively. As readily understood from the drawing, these outputs reach at least statuses "1", "0", "1", "1", "0", "1" and "1", respectively, and, if they correspond to the input codes "F", "E", "D", "C", "B", "A" and "S", respectively, this means that the input codes at the phase-code modulator 21 (FIGS. 9 and 10) have been reproduced. The output codes "A", "B", "C", "D" and "E" are transferred to the central processing unit 13 for the purpose as described previously.

In the above-described coded information transmission system of twin frequency code modulation type, the transmission speed is higher than that of the prior pulse number transmission type, and a fewer number of frequency oscillators are required and a multi-frequency filter is not required for demodulation as compared with the multi-frequency type. Moreover, it is easy to separate the coded information from the conversation to prevent erroneous operation due to interference. Furthermore, as a single oscillator device can include two signal sources of different frequencies, the same temperature stability is obtainable on the both frequencies and, accordingly, design of the demodulator is facilitated.

Figure 13:
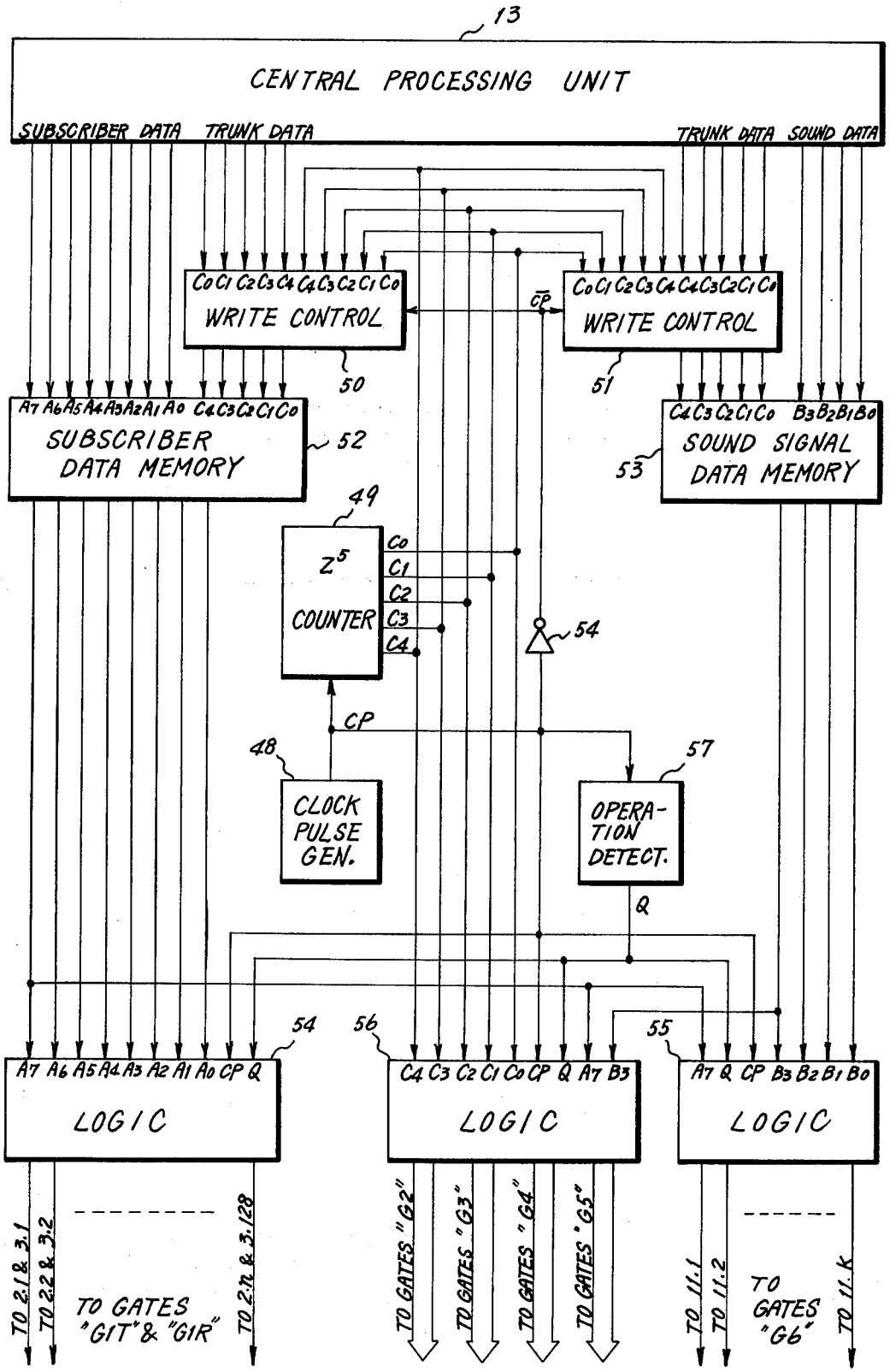
FIG. 13 is a schematic block diagram representing an embodiment of the gate control device of FIG. 1.
Figure 14:
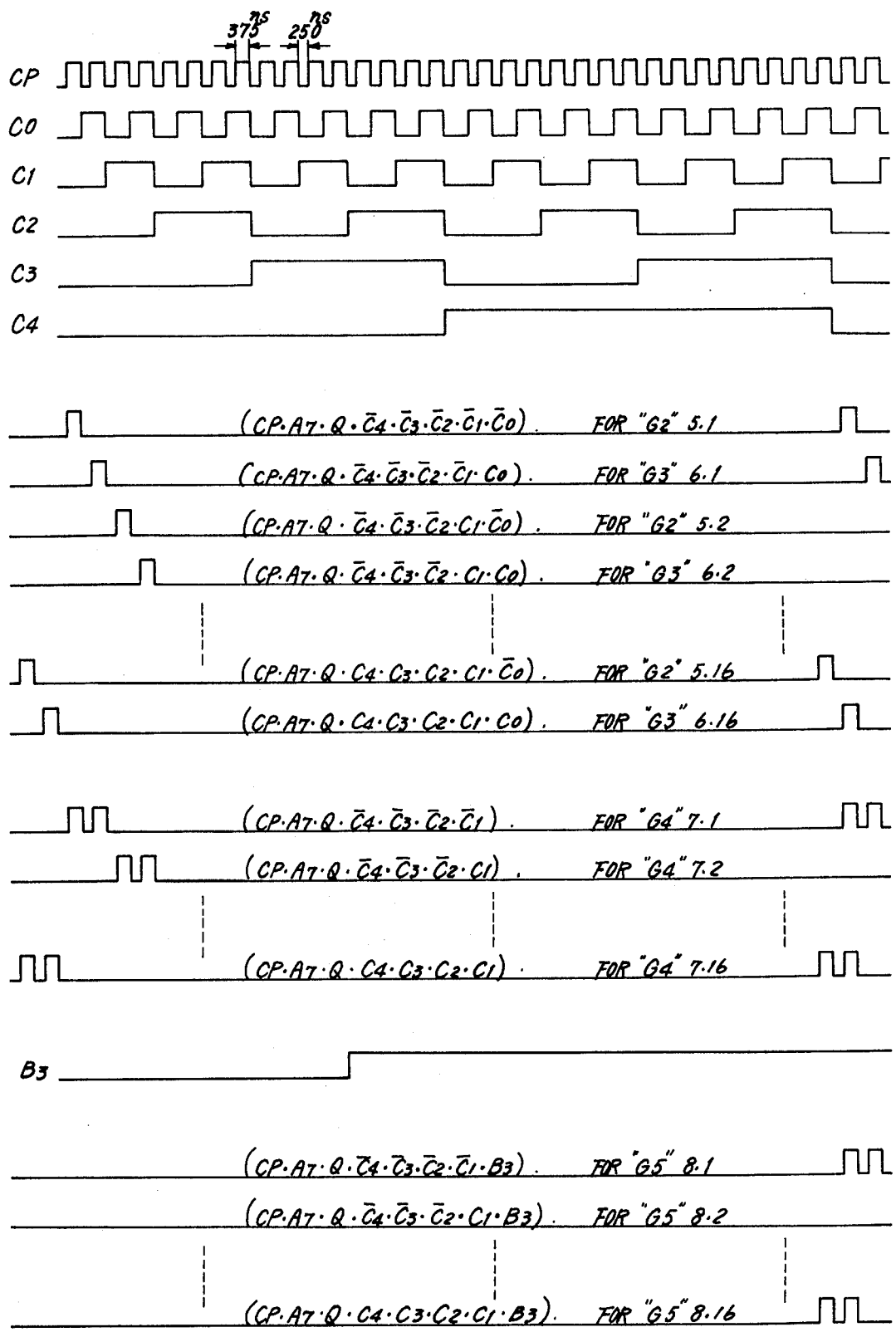
FIG. 14 is a waveform diagram presented for an aid in explanation of operation of the circuit of FIG. 13.

Referring next to FIG. 13, this drawing shows an embodiment of the gate control device 14 of FIG. 1. The circuit includes a clock pulse generator 48 which produces a clock pulse train CP, as shown in FIG. 14, having a pulse width of 375 nanoseconds and a pulse interval of 250 nanoseconds, for example. This pulse train CP is supplied to a frequency divider 49, which is a $2^5$ counter circuit having five outputs C0, C1, C2, C3 and C4 (FIG. 14) in this embodiment. These outputs form a binary code of five bits and is applied successively to first sets of inputs of write control devices 50 and 51, respectively. To second sets of inputs of the respective write control devices 50 and 51, there is also applied a binary code having five bits C0, C1, C2, C3 and C4 from the central information processing unit 13 (FIG. 1). This code carries trunk circuit information and, for example, the first (lowermost) bit "C0" is used to distinguish transmitting station and receiving station, that is, "0" of this bit expresses the transmitting station and "1" expresses the receiving station. The other four bits C4, C3, C2 and C1 form a binary code corresponding to the trunk circuit number. In this embodiment, "0000" expresses the trunk circuit 4.1 and "1111" indicates the trunk circuit 4.16 (FIG. 1).

The write control devices 50 and 51 are controlled in their write operation by a control signal which is, for example, an inversion CP of the clock pulse CP supplied through a NOT gate 54. In these circumstances, the write control devices 50 and 51 pass the trunk circuit information code for 250 nanoseconds, the clock pulse interval, when coincidence is obtained between both binary codes from the frequency divider 49 and the central processing unit 13. The outputs of the write control devices 50 and 51 are respectively supplied to first sets of inputs of subscriber data memory 52 and sound signal data memory 53.

The second set of inputs of the subscriber data memory 52 is also a binary code having eight bits A0, A1, A2, A3, A4, A5, A6 and A7 and carrying a subscriber information. In this embodiment, the bits A6, A5, A4, A3, A2, A1 and A0 form a binary code corresponding to the subscriber number, that is, "0000000" expresses a subscriber X1 having decimal number "001" and "1111111" expresses a subscriber X128 having number "128". The eighth (uppermost) bit "A7" is used for distinguishing whether the subscriber is using a trunk circuit or not, that is, "1" of the bit A7 expresses use of the trunk circuit and "0" expresses not-use thereof.

The subscriber data memory is a random access memory of 8 bits and 32 words, for example, and stores the above information in an address specified by the trunk circuit information supplied from the write control device 50 under control of the signal CP. The stored information is read out from the memory 52 every 128 counts of the $2^5$ counter 49, that is, at 20 microsecond periods and applied to a logic circuit 54. To the logic circuit 54, there are also applied the clock pulse CP from the clock pulse generator 48 and the detection signal Q from an operation detecting circuit 57. The detecting circuit 57 checks the clock pulse CP to verify operation of the clock pulse generator and keeps its output Q at HIGH level "1" in case of normal operation and at LOW level "0" in case of abnormal operation.

The logic circuit 54 includes at most 128 AND circuits for obtaining logic products of the inputs A7, CP and Q and seven members from A0, A1, A2, A3, A4, A5, A6, $\overline{A0}$, $\overline{A1}$, $\overline{A2}$, $\overline{A3}$, $\overline{A4}$, $\overline{A5}$ and $\overline{A6}$, which outputs are respectively connected to the gates "G1T" and "G1R" as their gate control pulses. For example, the AND gate having inputs A7, CP, Q, A6, A5, A4, A3, A2, A1 and A0 is connected to the "G1T" gate 2.1 and the "G1R" gate 3.1 and produces an output when the logic product of these inputs is "1" to open these gates for 375 nanoseconds at a period of 20 microseconds.

On the other hand, the write control device 51 supplies the truck circuit information (C4,C3,C2,C1,C0) to a sound signal data memory 53 which is, for example, a random access memory of 4 bits and 16 words, in the same fashion as in the case of the write control device 50. To the memory 53, there is also supplied a sound signal information code consisting of four bits B0, B1, B2 and B3. The last bit "B3" is used for distinguishing whether any signal sound is used or not and "1" of this bit expresses its use, while "0" expresses non-use. The other bits B2, B1 and B0 form a binary code expressing the sort of sound signal. For example, "000" expresses "initial buzz" which can be heard when the handset is taken up first, and "001" expresses "call ring" after the telephone number is introduced. The sound signal information is also stored similarly in the memory 53 and read out also in a 20 microsecond period. This information is supplied to a logic circuit 55 together with the signals CP, Q and A7. The logic circuits 55 also includes a plurality of AND gates having seven inputs which are CP, Q, A7 and B3 and three members of B0, B1, B2, $\overline{B0}$, $\overline{B1}$ and $\overline{B2}$. The outputs of these AND gates are connected respectively to the gates G6 corresponding to the respective sound signal generators (FIG. 1).

The outputs C0, C1, C2 and C4 of the frequency divider 49 is also supplied to a logic circuit 56 together with the signals CP, Q, A7 and B3. The logic circuit 56 includes four groups of AND gates. The AND gates of the first group have the inputs CR, Q, A7 and C0 and four members from C1, C2, C3, C4, $\overline{C1}$, $\overline{C2}$, $\overline{C3}$ and $\overline{C4}$ and their outputs are connected respectively to the gates G2 (FIG. 1). The AND gates of the second group have the same inputs as the first group except that $\overline{C0}$ is substituted for C0, and their outputs are connected respectively to the gates G3, respectively. Those of the third group have the same inputs as the first and second groups except that C0 and $\overline{C0}$ are cancelled, and their outputs are connected respectively to the gates G4 (FIG. 1). Those of the fourth group have the same inputs as the third group and an additional input B3, and connected respectively to the gates G5 (FIG. 1). This input combination, output connection and output waveforms are partly illustrated in FIG. 14 as an example.

As will be understood from the above description, in this embodiment of the invention, confirmation or distinction bits CP, Q, A7, B3 and C0 are supplied to the logic circuits 54, 55 and 56 in addition to the normal digital codes. Due to the inputs CP and Q, the logic circuits 54, 55 and 56 do not produce any output when no clock pulse is generated or it is abnormally generated. Due to presence of the input A7, no gate is opened and no communication is effected when no specific trunk circuit is shared for operation. Due to presence of the signal B3, the gates G5 and G6 are kept as closed when the signal sound generating device is not used. The signals C0 and $\overline{C0}$ serve to distinguish the transmitter and receiver. By applying these distinction signals to the logic circuits, any interference or cross-talk which may be caused by some trouble in circuit or erroneous operation is overcome.

The transmission gates (G1T) 2.1, 2.2, ... 2.n coupled respectively to the telephone sets 1.1, 1.2, ... 1.n and the G2 gates 5.1, 5.2, ... 5.m and the G3 gates 6.1, 6.2, ... 6.m respectively coupled to the demodulator-adder circuits DA1, DA2, ... DAm of the trunk circuits 4.1, 4.2, ... 4.m are generally interconnected as shown in FIG. 15 through the line conductor TL which is grounded through a resistor $R_T$. While these gates may be composed of bipolar transistors or MOS (metal oxide semiconductor) transistors, MOS transistors are preferred for this purpose since they exhibit such high advantages as low power consumption and high packing density. However, due to high conduction resistance, MOS transistors encounter a problem of low switching speed caused by load capacitance and stray capacitance when driven by time-division gate control signals.

More particularly, the gates G1T each have stray capacitance $C_\alpha$, the line conductor TL has stray capacitance $C_T$ and the gates G2 and G3 each have stray capacitance $C_{62}$, as shown in FIG. 15. For instance, when the G1T gate 2.1 and the G2 gate 5.1 are opened synchronously to transfer subscriber information from the telephone set 1.1 through the line conductor TL to the demodulator-adder circuit DA1, the stray capacitances $C_\alpha$, $C_T$ and $C_\beta$ are inserted in parallel with respect to the flow of subscriber information and, therefore, the total stray capacitance $C_S$ is written as follows.

$$C_S = nC_\alpha + 2mC_\beta + C_T$$

If the conduction resistances of the gates 2.1 and 5.1 are represented by resistors $R_{2.1}$ and $R_{5.1}$, an equivalent circuit is given by FIG. 17.

Under the above circumstances, a pulse signal A appearing at the output of the G1T gate 2.1, as shown in FIG. 16 (1), is stored in the capacitor $C_1$ of the demodulator-adder circuit DA1 and also in the total stray capacitance $C_S$. In this case, the leading edge of the signal A stored in the capacitance $C_1$ is deformed as shown in FIG. 16(3) by the resistors $R_{2.1}$ and $R_{5.1}$. Moreover, the charge stored in the total stray capacitance $C_S$ is discharged through the resistor $R_T$ simultaneously with closure of the gates 2.1 and 5.1, taking a long discharge time due to large value of the total stray capacitance $C_S$. This results in a slow trailing edge which may interfere with another subscriber signal pulse B being transferred side by side through the same conductor and cause cross-talk, as shown by shaded portion in FIG. 16(2). According to another feature of this invention, the abovementioned trouble is removed by reducing the driving impedance and stray capacitance of the line conductor by using the following circuit configuration.

FIG. 18 shows an improvement of the circuit of FIG. 15. In this arrangement, the n G1T gates 2.1, 2.2, ... 2.n are classified into s groups each including r G1T gates and the outputs of G1T gates of the respective groups are connected to the inputs of s impedance transformers 57.1, 57.2, ... 57.s, respectively. The outputs of the impedance transformers are connected respectively through forwardly directed diodes 58.1, 58.2, ... 58.s to one end of the line conductor TL. The m trunk circuits 4.1, 4.2, ... 4.m are also classified into t groups each including q trunk circuits and the inputs of trunk of the respective groups are connected to the outputs of t impedance transformers 60.1, 60.2, ... 60.t respectively.

The inputs of the impedance transformers are connected in common with the other end of the line conductor TL.

Assuming now the total stray capacitance of the circuit in the lefthand side of the cathode of each diode as $C'$ and that of the circuit in the righthand side of the input of each impedance transformer 60.1, 60.2, ... or 60.t as $C'_\beta$, each impedance transformer is provided to make $C'$ less than $rC$ and $C'$ less than $2qC$. Therefore, the total stray capacitance $C_S'$ of the circuit of FIG. 18 is as follows.

$$C_S = sC_\alpha + 2tqC_\beta + C_T = \frac{n}{r} C_\alpha + \frac{2m}{2q} C_\beta + C_T \frac{n}{r} rC_\alpha + \frac{2m}{2q} 2qC_\beta + C_T = nC_\alpha + 2mC_\beta + C_T = C_S$$

The impedance transformers 57.1, 57.2, ... 57.s and 60.1, 60.2, ... 60.t also reduce the transmission line between the G1T gates and the gates G2 and G3. The abovementioned reduction of stray capacitance and driving impedance results in improvement of the leading edge of the pulsed information. Low output impedances of the impedance transformers 57.1, 57.2, ... 57.s enable reduction of the grounding resistance $R_T$.

Resistors 59.1, 59.2, ... 59.s for grounding the inputs of the impedance transformers 57.1, 57.2, ... 57.s are provided for reducing the time-constant due to stray capacitances C of the G1T gates. This time constant can be made small by reducing the value of these resistors but this value can not be made extremely small since a.c. loss due to the conduction resistance of the G1T gate is increased thereby. The object of each diode is to block any information coming in the corresponding impedance transformer from the other impedance transformers.

FIG. 19 shows a preferred embodiment of the arrangement of FIG. 18, in which the impedance transformers 57.1, 57.2, ... 57.s and 60.1, 60.2, ... 60.t are composed of bipolar transistors. FIGS. 20(a), (b), (c) and (d) show the waveforms at the circuit points (a), (b), (c) and (d), respectively, as shown in FIG. 19. In this circuit, the information signal reduces its amplitude successively due to the base-emitter voltage $V_{be}$ of the transistors and the forward voltage drop $V_d$ of the diode, but keeps its leading and trailing edge in good condition.

When the input impedances of the impedance transformers 60.1, 60.2, ... 60.t are very low, the grounding resistor $R_T$ can be omitted. Furthermore, these impedance transformers may be also omitted.

What is claimed is:

1. A telephone exchange system, comprising a plurality of telephone sets each having a microphone and an earphone, means for generating a hook signal in response to a telephone call starting action and means of generating coded information signals, a plurality of pairs of first gates connected respectively to said microphones and earphones, a first line conductor connected in common to the outputs of said first gates connected to said microphones, a second line conductor connected in common to the inputs of said first gates connected to said earphones, a plurality of trunk circuits each including a demodulator-adder circuit for demodulating and then adding the inputs thereof and a coded information receiving circuit connected to the output of said demodulator-adder circuit for receiving selectively said coded information signals from said output, second and third gates connected between said first line conductor and the inputs of said demodulator-adder circuit of said each trunk circuit, a fourth gate connected between the output of said demodulator-adder circuit of said each trunk circuit and said second line conductor, a common signal sound generating device connected to the inputs of said fourth gates through fifth gates respectively, a subscriber scanning device for receiving said hook signal from a first telephone set and producing a subscriber discriminating signal for said telephone set, a central information processing device for storing the statuses of said plurality of telephone sets and trunk circuits and time-division gate control signals which are peculiar to said respective telephone sets, producing a first subscriber information signal corresponding to said first telephone set and a trunk signal for designating a vacant trunk circuit in response to said subscriber discriminating signal and also producing a second subscriber information signal corresponding to a second telephone set which is designated by the output of the coded information receiving circuit of said designated trunk circuit in response to said output and producing sound signal information indicative of the sound signal to be generated by said sound signal generating device, and a gate control device for supplying said time-division gate control signal which is peculiar to said first telephone set to said first gates connected to said first telephone set and to said second, fourth and fifth gates connected to said designated trunk circuit and also supplying said time-division gate control signal which is peculiar to said second telephone set to said first gates connected to said second telephone set and to said third, fourth and fifth gates connected to said designated trunk circuit.

2. The system according to claim 1, wherein said common signal sound generating device includes a plurality of sound signal generators, sixth gates connected to the outputs of said sound signal generators respectively and a third line conductor connected in common between the outputs of said sixth gates and the inputs of said fifth gates, said central information processing device includes means of generating sound signal information for designating one of said sound signal generators corresponding to said coded information signal, and said gate control device includes means of supplying the time-division gate control signals which are peculiar to said first and second telephone sets respectively to said sixth gate connected to said designated sound signal generator.

3. The system according to claim 1, wherein said means for generating coded information signals comprises a phase-code modulator circuit for producing a phase-code modulated signal corresponding to information to be transferred, a twin frequency oscillator circuit for producing a pulse train with two frequencies corresponding to both the levels of said phase-code modulated signal, a frequency divider circuit for producing a frequency divided signal of said pulse train, means for controlling the bit time of said phase-code modulated signal by said frequency divided signal at that time and a filter circuit for filtering said pulse train with two frequencies and producing a twin frequency code modulated signal; and said coded information receiving circuit comprises a frequency discriminator for discriminating the frequencies of said twin frequency code modulated signal to reproduce said phase-code modulated signal and a phase-code demodulator for demodulating said phase-code modulated signal to reproduce the coded information.

4. The system according to claim 1, wherein said first and second subscriber information signals are binary codes consisting of a first portion which expresses the status of use of a trunk circuit and a second portion which expresses the number of subscriber, said sound signal information is a binary code consisting of a first portion which expresses the status of use of said signal sound generating device and a second portion which expresses the kind of signal sound, and said trunk signal is a binary code consisting of a first portion which expresses the transmitter side or the receiver side and a second portion which expresses the trunk number, and said gate control device includes means for generating a series of clock pulses, a frequency divider circuit for frequency-dividing said clock pulse series into sub-multiples of the frequency of the generated series to produce a set of frequency-divided outputs having first and second portions corresponding to the first and second portions of said trunk signal, a subscriber data memory for effecting write and read operations of said subscriber information signal in synchronism with said generated series of clock pulses, a signal sound data memory for effecting write and read operations of said sound signal information in synchronism with said generated series of clock pulses, logic circuits containing a plurality of AND circuits, a first AND circuit forming part of said logic circuits having said subscriber information signal read out from said subscriber data memory and said series of clock pulses as its inputs and producing gate control signals to control said first gates, a second AND circuit forming part of said logic circuits having the outputs of said frequency divider, said series of clock pulses and said first portion of subscriber information signal as its inputs and producing gate control signals for controlling said second and third gates, a third AND circuit forming part of said logic circuits having the second portion of the outputs of said frequency divider, said series of clock pulses and said first portion of subscriber information signal as its inputs and producing gate control signals for controlling said fourth gates, a fourth AND circuit forming part of said logic circuits having the second portion of the output of said frequency divider, said series of clock pulses and said first portion of subscriber information as its inputs and producing gate control signals for controlling said fifth gates.

5. The system according to claim 2, wherein said first and second subscriber information signals are binary codes consisting of a first portion which expresses the status of use of a trunk circuit and a second portion which expresses the number of subscriber, said sound signal information is a binary code consisting of a first portion which expresses the status of use of said signal sound generating device and a second portion which expresses the kind of signal sound, and said trunk signal is a binary code consisting of a first portion which expresses the transmitter side or the receiver side and a second portion which expresses the trunk number, and said gate control device includes means for generating a series of clock pulses, a frequency divider circuit for frequency-dividing said clock pulse series into sub-multiples of the frequency of the generated series to produce a set of frequency-divided outputs having first and second portions corresponding to the first and second portions of said trunk signal, a subscriber data memory for effecting write and read operations of said subscriber information signal in synchronism with said generated series of clock pulses, a signal sound data memory for effecting write and read operations of said sound signal information in synchronism with said generated series of clock pulses, logic circuits containing a plurality of AND circuits, a first AND circuit forming part of said logic circuits having said subscriber information signal read out from said subscriber data memory and said series of clock pulses as its inputs and producing gate control signals to control said first gates, a second AND circuit forming part of said logic circuits having the outputs of said frequency divider, said series of clock pulses and said first portion of subscriber information signal as its inputs and producing gate control signals for controlling said second and third gates, a third AND circuit forming part of said logic circuits having the second portion of the outputs of said frequency divider, said series of clock pulses and said first portion of subscriber information signal as its inputs and producing gate control signals for controlling said fourth gates, a fourth AND circuit forming part of said logic circuits having the second portion of the output of said frequency divider, said series of clock pulses, said first portion of subscriber information as its inputs and producing gate control signals for controlling said fifth gates, and a fifth AND circuit forming part of said logic circuits having said sound signal information, said series of clock pulses and said first portion of subscriber information signal as its inputs and producing gate control signals for controlling said sixth gates.

6. The system according to claim 4, wherein said gate control device further includes means for detecting the operation of said means for generating a clock pulse and producing a distinction code expressing the status of said operation and means connecting said distinction code to a further input of each of said first, second, third, fourth and fifth AND circuits.

7. The system according to claim 1, wherein said first gates connected to said microphones are classified into a plurality of groups, the outputs of said first gates of each group are connected in common through an impedance transformer and a forwardly directed diode to said first line conductor, and said first line conductor is grounded through a resistor.

8. The system according to claim 1, wherein said first gates connected to said microphones are classified into a plurality of groups, the outputs of said first gates of each group are connected in common through a first impedance transformer to said first line conductor, said second and third gates are classified into a plurality of groups, and said first line conductor is connected through a second impedance transformer to the inputs of said second and third gates of each group.

9. A telephone exchange system, comprising a plurality of telephone sets each having a microphone and an earphone, means for generating a hook signal in response to a telephone call starting action and means for generating coded information signals, a plurality of pairs of first gates connected respectively to said microphones and earphones, a first line conductor connected in common to the outputs of said first gates connected to said microphones, a second line conductor connected in common to the inputs of said first gates connected to said earphones, a plurality of first trunk circuits each including a demodulator-adder circuit for demodulating and then adding the inputs thereof and a coded information receiving circuit connected to the output of said demodulator-adder circuit for receiving selectively said coded information signals from said output, at least one second trunk circuit including at least two demodulator-adder circuits for demodulating and then adding the inputs thereof, an adder circuit connected to the outputs of said demodulator-adder circuits for adding said outputs and a coded information receiving circuit connected to the output of said adder circuit for receiving selectively said coded information signals from said output, second and third gates connected between said first line conductor and the inputs of said demodulator-adder circuit of each of said trunk circuits, a fourth gate connected between the input of said coded information receiving circuit of each of said trunk circuits and said second line conductor, a plurality of fifth gates, a common signal sound generating device connected to the inputs of said fourth gates through said fifth gates respectively, a subscriber scanning device for receiving said hook signal from a first telephone set and producing a subscriber discriminating signal for said telephone set, a central information processing device for storing the statuses of said plurality of telephone sets and trunk circuits and time-division gate control signals which are peculiar to said respective telephone sets and producing a first subscriber information signal corresponding to said first telephone set and a trunk signal for designating a vacant trunk circuit in response to said subscriber discriminating signal and also producing a second subscriber information signal corresponding to a second telephone set which is designated by the output of the coded information receiving circuit of said designated trunk circuit in response to said output and producing sound signal information indicative of the sound signal to be generated by said sound signal generating device, and a gate control device for supplying said time-division gate control signal which is peculiar to said first telephone set to said first gates connected to said designated trunk circuit and also supplying said time-division gate control signal which is peculiar to said second telephone set to said first gates connected to said second telephone set and to said third, fourth and fifth gates connected to said designated trunk circuit.

10. The system according to claim 9, wherein a single common coded information receiving circuit is connected to the output of said adder circuit.

11. The system according to claim 9, wherein said adder circuit is a single-pole single-throw switch.

12. A telephone exchange system comprising a plurality of telephone sets each having a microphone and an earphone, means for generating a hook signal in response to a telephone call starting action and means for generating coded information signals, a plurality of pairs of first gates connected respectively to said microphones and earphones, a first line conductor connected in common to the outputs of said first gates connected to said microphones, a second line conductor connected in common to the inputs of said first gates connected to said earphones, a plurality of trunk circuits each having a demodulator-adder circuit for demodulating and then adding the inputs thereof and a coded information receiving circuit connected to the output of said demodulator-adder circuit for receiving selectively said coded information signals from said output, second and third gates connected between said first line conductor and the inputs of said demodulator-adder circuit of each of said trunk circuits, a fourth gate connected between the output of said demodulator-adder circuit of each of said trunk circuits and said second line conductor, a common signal sound generating device connected to the inputs of said fourth gates through fifth gates respectively, a subscriber scanning device for receiving said hook signal from a first telephone set and producing a subscriber discriminating signal for said telephone set, a central information processing device for storing the statuses of said plurality of telephone sets and trunk circuits and time-division gate control signals which are peculiar to said respective telephone sets and producing a first subscriber information signal corresponding to said first telephone set and a trunk signal for designating a vacant trunk circuit in response to said subscriber discriminating signal and also producing a second subscriber information signal corresponding to a second telephone set which is designated by the output of the coded information receiving circuit of said designated trunk circuit in response to said output and producing sound signal information indicative of the sound signal to be generated by said sound signal generating device, and a gate control device for supplying said time-division gate control signal which is peculiar to said first telephone set to said first gates connected to said first telephone set and to said second, fourth and fifth gates connected to said designated trunk circuit and also supplying said time-division gate control signal which is peculiar to said second telephone set to said first gates connected to said second telephone set and to said third, fourth and fifth gates connected to said designated trunk circuit, wherein the system further comprises a seventh gate and a plurality of eighth gates the inputs of which are connected in common to said second line conductor, a plurality of second demodulator-adder circuits having first and second inputs for demodulating and then adding the inputs thereof, said first inputs of said demodulator-adder circuits being connected in common to the output of said seventh gate and said second inputs thereof being connected respectively to the outputs of said eighth gates, a plurality of amplifiers connected respectively to the outputs of said demodulator-adder circuits each being provided with a driving terminal, a plurality of speakers connected respectively to the outputs of said amplifiers, a plurality of relay switches connected between a voltage source and the driving terminals of said amplifiers respectively, and a relay control device for energizing said relay switches to actuate said amplifiers such that all relay switches are energized when said seventh gate is actuated and each relay switch is energized when said eighth gate corresponding to said relay switch is actuated, under control of said central information processing device.

* * * * *